Aug. 12, 1941.   J. W. MURPHY   2,252,602
TIRE HANGER
Filed Oct. 4, 1938
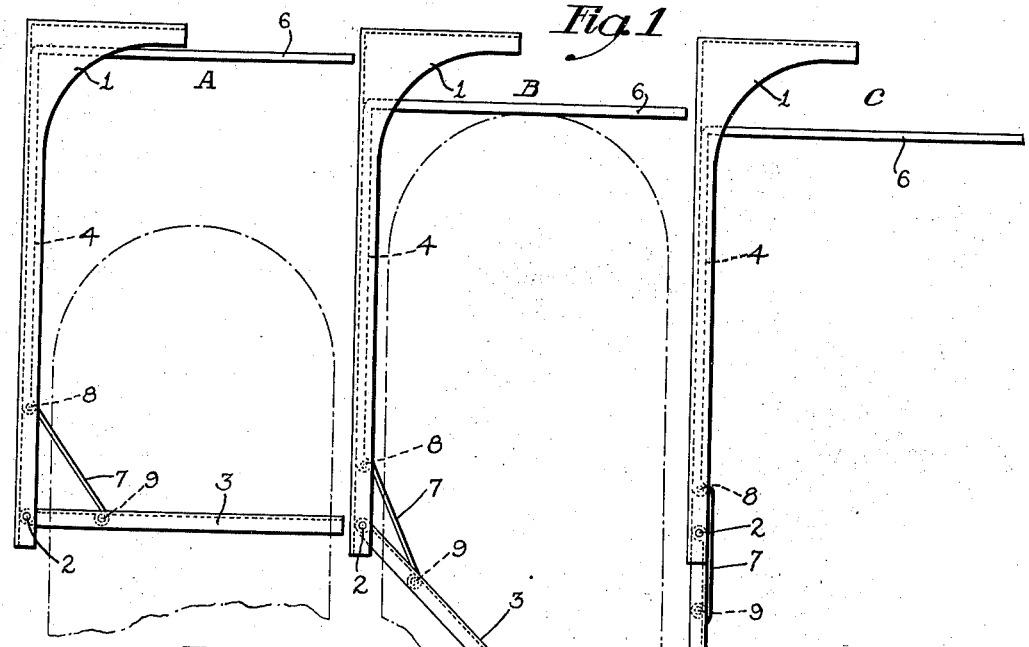
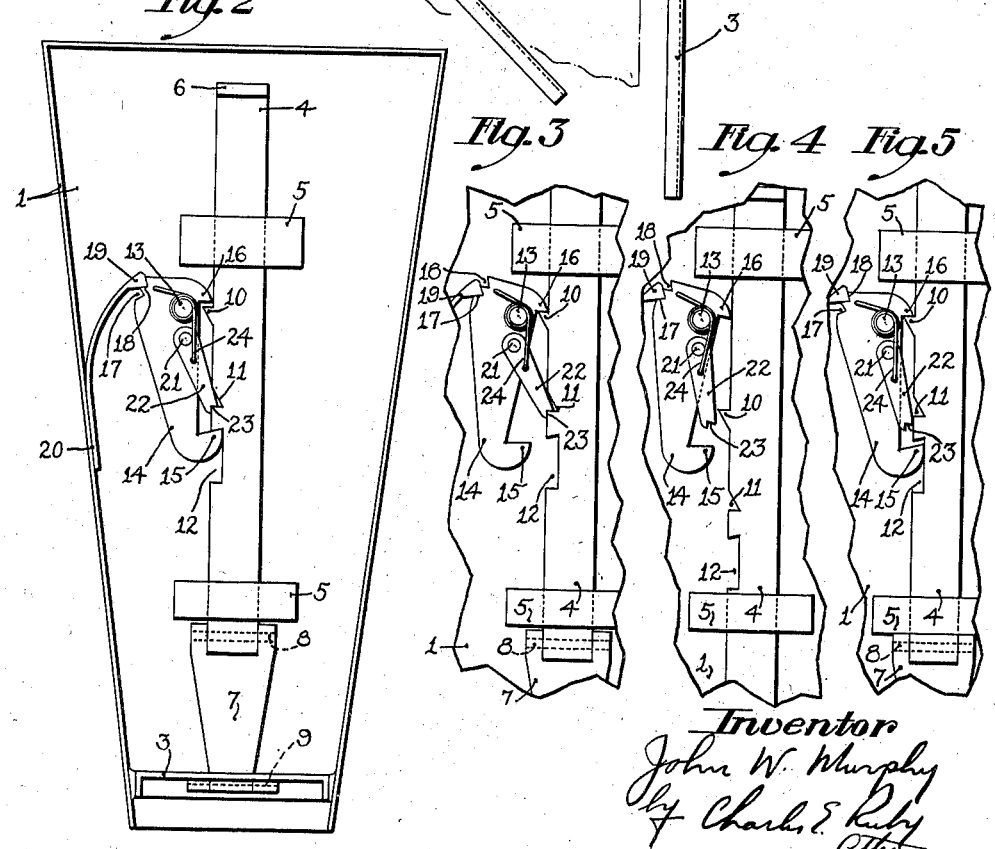
Inventor
John W. Murphy
by Charles E. Ruby
Atty.

Patented Aug. 12, 1941

2,252,602

UNITED STATES PATENT OFFICE 2,252,602

TIRE HANGER

John W. Murphy, Concord, Mass.

Application October 4, 1938, Serial No. 233,335

8 Claims. (Cl. 211—23)

The present invention relates generally to hangers for automobile and bicycle tires and similar annular objects, more particularly to automatically-operating hangers for the described purposes, and specifically to tire hangers of the character described, by the use of a plurality of which, tires may be stored in closely packed arrangement, yet with each tire readily available for instantaneous removal from its hanger without disturbance of the tires stored adjacent thereto.

The principal object of the present invention is to provide an improved hanger for tires, into which a tire can be instantaneously inserted for storage, and from which a tire can be instantaneously removed for use, by manipulation of the tire alone, in a region thereof distant from the hanger by the diameter of the tire.

Another object of the present invention is to provide an improved tire hanger of the character described, by the use of a plurality of which, tires can be stored in a series and spaced apart at distances no greater than the thicknesses of the frames of the improved tire hangers.

Another object of the present invention is to provide an improved tire hanger of the character described, which is simple in construction and operation, and which is inexpensive to manufacture.

The attainment of these, and other, objects of my invention and the advantages attendant upon the use thereof will become apparent when consideration is given to the following description and to the accompanying drawing, which forms a part of the specification, and wherein Fig. 1, A, is a side elevation of the improved tire hanger in use, showing a tire suspended upon the supporting member thereof, Fig. 1, B, is a side elevation of the improved tire hanger, with its latching mechanism disengaged, showing a tire being removed from (or being inserted into) the improved tire hanger, Fig. 1, C, is a side elevation of the improved tire hanger, with its latching mechanism disengaged and its supporting member in its lowest position, ready for the reception of a tire, Fig. 2 is a front elevation of the improved tire hanger, showing its latching mechanism engaged, and its engaged slidable member, together with the cooperating interconnecting member, maintaining the supporting member thereof in the supporting position, Fig. 3 is a view of the latching mechanism and a portion of the slidable member, showing the latching mechanism disengaged and the slidable member free to slide downwardly to allow the supporting member to assume the position of the supporting member shown in Fig. 1, C, Fig. 4 is a view of the latching mechanism and a portion of the slidable member, showing the latching mechanism disengaged and the slidable member in its lowest position, at which the supporting member has assumed the position of the supporting member shown in Fig. 1, C, Fig. 5 is a view of the latching mechanism and a portion of the slidable member, showing the latching mechanism just after it has assumed the position of engagement, but before the slidable member has become latched in position.

In the drawing, 1 is an L-shaped frame, attachable to an overhead support by suitable means such as screws, to the lower end of which is attached by the hinge means 2 the supporting member 3. A slidable member 4, slidable within the straps 5, 5 attached to the frame 1, is provided at its upper end with the horizontal extension 6. An interconnecting member 7 is attached at its upper end to the lower end of the slidable member 4 by the hinge means 8, and is attached at its lower end to the supporting member 3 by the hinge means 9. The slidable member 4 is provided with a shoulder 10, a notch 11, and a recess 12, the upper end wall of which constitutes one portion of the latching mechanism. Upon the pivot pin 13, carried by the frame 1, is mounted rotatably the lever 14, provided at its lower end with the hook 15 constituting another portion of the latching mechanism, at its upper forward end with the hook 16, and at its upper rear end with the detent notches 17 and 18, wherein rides in and out the end of the detent 19, secured to the frame 1 at 20. Upon the pivot pin 21, carried by the rotatable lever 14, is mounted rotatably the dog 22, provided with the notch 23, adapted to engage with, and to receive, the corner of the notch 11, as shown in Figs. 2 and 3. Also mounted rotatably upon the pivot pin 21 is the spring 24, one end of which is secured to the rotatable lever 14, and the other end of which is secured to the dog 22, so that the spring 24, when unstressed, determines the position of the dog 22 with respect to the rotatable lever 14.

The operation of the improved tire hanger is as follows: Assume that the improved tire hanger is in the stage of use shown in Fig. 1, C, and that therefore the latching mechanism is in the stage of use shown in Fig. 4. A tire is now introduced into the improved tire hanger by elevating the tire until the crown of its tread makes contact with the horizontal extension 6 of the slidable member 4. Further elevation of the tire raises the slidable member 4, which, through the interconnecting member 7, rotates the supporting member 3 in a counterclockwise manner until it assumes a horizontal position. A very slight additional elevation of the tire causes the shoulder 10 of the slidable member 4 to become engaged with the upper hook 16 of the rotatable lever 14, and to rotate lever 14 until the hook 15 enters the recess 12 in the slidable member 4, and the detent 19 rides out of the lower notch 17 into the upper notch 18 in the rotatable lever 14, there to maintain the rotatable lever 14 in the position it occupies in Fig. 5. Since the dog 22 is maintained in position fixed with respect to the rotatable lever 14 by the spring 24, when unstressed, the rotation of the rotatable lever 14 causes the lower end of the dog 22 to come into, and to be held in, contact with the slidable member 4, as shown in Fig. 5. A slight lowering of the tire, corresponding to the previous slight additional elevation of the tire, permits the slidable member 4 to slide downwardly, until the hook 15 of the rotatable lever 14 becomes engaged with the upper end wall of the recess 12 in the slidable member 4; and thus the slidable member is latched against further downward movement with respect to the frame 1, and therefore maintains the supporting member 3 in the supporting position wherein it is adapted to support the tire when it is lowered onto the supporting member 3. The latching mechanism is now in the stage of use shown in Fig. 2, the lower hook 15 of the rotatable lever 14 being in engagement with the upper end wall of the recess 12 in the slidable member 4, the upper hook 16 of the rotatable lever 14 being above and out of contact with the shoulder 10 of the slidable member 4, the end of the detent 19 being engaged in the upper notch 18 in the rotatable lever 14, and the notch 23 in the dog 22 being in engagement with the corner of the notch 11 of the slidable member 4. When now the suspended tire is elevated, and lifted out of contact with the supporting member 3, and thereabove until the crown of its tread makes contact with the horizontal extension 6 of the slidable member 4, a very slight additional elevation of the tire effects a correspondingly slight upward displacement of the slidable member 4, causing the rotatable lever 14 to become rotated clockwise by the thrust exerted thereon by the dog 22, so that the lower hook 15 of the rotatable lever 14 becomes withdrawn from the recess 12 in the slidable member 4, and the end of the detent 19 rides out of the upper notch 18 into the lower notch 17 in the rotatable lever 14. Rotation of the rotatable lever 14 ceases when the upper hook 16 of the rotatable lever 14 becomes engaged with the shoulder 10 of the slidable member 4. The latching mechanism is then in the stage of use shown in Fig. 3. A slight lowering of the tire, corresponding to the previous slight additional elevation of the tire, permits the slidable member 4 to slide downwardly, the engagement of the dog 22, at its notch 23, with the corner of the notch 11 in the slidable member becomes broken, and the spring 24 impels the dog 22 away from the slidable member 4, which is free to descend until it assumes the position shown in Fig. 4, and, in consequence, the supporting member 3 is rotated clockwise until it hangs downwardly in alignment with the vertical portion of the frame 1, and the tire falls out of the improved tire hanger.

From the description of the construction and operation of the improved tire hanger, it is obvious that a tire can be inserted into, and withdrawn from, the improved tire hanger by simple manipulation of the tire itself, and without the necessity of any manual contact with the improved tire hanger. The feature of readily realizable and expedient withdrawal of the tire from the improved tire hanger is of particular value, for tires, hung overhead in the improved tire hangers, can be readily withdrawn from the improved tire hangers simply by elevating the tires with a pole, to extents sufficient to unlatch the slidable members, whereupon the tires drop out of the improved tire hangers.

From an examination of the drawing, and, more particularly, of Fig. 1, A, B, and C, it is also obvious that a plurality of these improved tire hangers can be arranged in a series, spaced apart at distances substantially equally to the thicknesses of the vertical portions of the frames of the improved tire hangers, so that the tires can be stored in the improved tire hangers in relatively close-packed arrangement.

While I have shown a preferred embodiment of my invention, the invention is not to be limited thereto, for it is to be understood as broadly novel as is commensurable with the scopes of the appended claims.

I claim:

1. A tire hanger comprising, in combination, a frame, a supporting member hinged to the frame, a slidable member slidable in the frame and having a horizontal extension at its upper end, an interconnecting member uniting the slidable member and the supporting member, and latching mechanism distributed between the frame and the slidable member for latching and unlatching the slidable member against unidirectional movement relative to the frame operable by successive slight oscillations of the horizontal extension of the slidable member.

2. A tire hanger comprising, in combination, an L-shaped frame, a supporting member hinged to the L-shaped frame at its lower end, a slidable member slidable vertically in the L-shaped frame and having a horizontal extension at its upper end, an interconnecting member hinged at its ends to the lower end of the slidable member and to the supporting member, and latching mechanism distributed between the L-shaped frame and the slidable member for latching and unlatching the slidable member against downward movement operable by manipulation of the horizontal extension of the slidable member.

3. A tire hanger comprising, in combination, a frame, a supporting member hinged to the frame, a slidable member slidable in the frame and operatively connected to the supporting member, and latching mechanism for latching and unlatching the slidable member against unidirectional movement relative to the frame comprising a rotatable lever pivoted upon the frame and provided with an upper hook, a lower hook, and detent notches, a dog pivoted upon the rotatable lever and provided with an engaging notch, a spring mounted rotatably upon the pivot carrying the rotatable lever, with its ends secured to the rotatable lever and to the dog, a detent mounted upon the frame and engageable in the detent notches of the rotatable lever, and means provided in the slidable member cooperating with the hooks of the rotatable lever and with the dog.

4. A tire hanger comprising, in combination, a frame, a supporting member hinged to the frame, a slidable member slidable in the frame, operatively connected to the supporting member, and provided with a shoulder, a notch, and a lateral recess, and latching mechanism for latching and unlatching the slidable member against unidirectional movement relative to the frame carried by the frame and cooperating with the shoulder, the notch, and the lateral recess of the slidable member.

5. A tire hanger comprising, in combination, an L-shaped frame, a supporting member hinged to the L-shaped frame at its lower end, a slidable member slidable vertically in the L-shaped frame, having a horizontal extension at its upper end, and provided with a shoulder, a notch, and a lateral recess, an interconnecting member hinged at its ends to the lower end of the slidable member and to the supporting member, and latching mechanism for latching and unlatching the slidable member against downward movement operable by successive slight oscillations of the horizontal extension of the slidable member and comprising a rotatable lever pivoted upon the L-shaped frame and provided with an upper hook engageable with the shoulder of the slidable member, a lower hook engageable in the lateral recess of the slidable member, and detent notches, a dog pivoted upon the rotatable lever and provided with a notch engageable in the notch of the slidable member, a spring mounted rotatably upon the pivot carrying the rotatable lever, with its ends secured to the rotatable lever and to the dog, and a detent mounted upon the L-shaped frame and engageable in the detent notches of the rotatable lever.

6. Latching mechanism for latching and unlatching against unidirectional movement a longitudinally oscillatable member operable by successive slight oscillations of the longitudinally oscillatable member comprising, in combination, a rotatable lever rotatable upon a pivot fixed with respect to the path of the longitudinally oscillatable member and provided with an upper hook, a lower hook, and detent notches, a dog pivoted upon the rotatable lever and provided with an engaging notch, a spring mounted rotatably upon the pivot carrying the rotatable lever, with its ends secured to the rotatable lever and to the dog, a detent mounted in fixed relation to the pivot carrying the rotatable lever, and means provided in the longitudinally oscillatable member cooperating with the hooks of the rotatable lever and with the dog.

7. Latching mechanism for latching and unlatching against unidirectional movement a longitudinally oscillatable member operable by successive slight oscillations of the longitudinally oscillatable member comprising, in combination, a shoulder, a notch, and a lateral recess, provided in the longitudinally oscillatable member, and mechanism operable about a point fixed with respect to the path of the longitudinally oscillatable member and cooperating with the shoulder, the notch, and the lateral recess, provided in the longitudinally oscillatable member.

8. Latching mechanism for latching and unlatching against unidirectional movement a longitudinally oscillatable member operable by successive slight oscillations of the longitudinally oscillatable member comprising, in combination, a shoulder, a notch, and a lateral recess, provided in the longitudinally oscillatable member, and a rotatable lever rotatable upon a pivot fixed with respect to the path of the longitudinally oscillatable member and provided with an upper hook engageable with the shoulder of the longitudinally oscillatable member, a lower hook engageable in the lateral recess of the longitudinally oscillatable member, and detent notches, a dog pivoted upon the rotatable member and provided with a notch engageable in the notch of the longitudinally ocillatable member, a spring mounted rotatably upon the pivot carrying the rotatable lever, with its ends secured to the rotatable lever and to the dog, and a detent mounted in fixed relation to the pivot carrying the rotatable lever and engageable in the detent notches of the rotatable lever.

JOHN W. MURPHY.